(12) United States Patent
Kwak et al.

(10) Patent No.: US 10,129,051 B2
(45) Date of Patent: Nov. 13, 2018

(54) METHOD AND APPARATUS FOR ITERATIVE INTERFERENCE CANCELLATION AND CHANNEL ESTIMATION OF SYSTEM BASED ON FTN COMMUNICATION INCLUDING PILOT

(71) Applicant: ELECTRONICS AND TELECOMMUNICATIONS RESEARCH INSTITUTE, Daejeon (KR)

(72) Inventors: Sang-Woon Kwak, Daejeon (KR); Joung-Il Yun, Daejeon (KR); Myung-Sun Baek, Daejeon (KR); Hae-Chan Kwon, Daejeon (KR); Young-Su Kim, Daejeon (KR); Hyoung-Soo Lim, Daejeon (KR); Nam-Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/659,453

(22) Filed: Jul. 25, 2017

(65) Prior Publication Data
US 2018/0205578 A1    Jul. 19, 2018

(30) Foreign Application Priority Data
Jan. 18, 2017  (KR) .................... 10-2017-0008849

(51) Int. Cl.
H04L 25/02    (2006.01)
H04L 1/00    (2006.01)
H04L 25/03    (2006.01)

(52) U.S. Cl.
CPC ........ *H04L 25/0228* (2013.01); *H04L 1/0054* (2013.01); *H04L 25/03853* (2013.01); *H04L 1/0047* (2013.01); *H04L 1/0052* (2013.01)

(58) Field of Classification Search
CPC ........................... H04L 1/0047; H04L 1/0052
See application file for complete search history.

(56) References Cited

U.S. PATENT DOCUMENTS 6,647,003 B1 *  11/2003  Abeta ................. H04L 25/0234
                                            370/335
8,514,966 B2 *  8/2013  Wajcer ................. H04L 25/068
                                            342/352

(Continued)

FOREIGN PATENT DOCUMENTS

KR    10-2016-0133532 A    11/2016
WO    WO 2015/135436 A1    9/2015

*Primary Examiner* — Ross E. Varndell

(57) ABSTRACT

Disclosed herein are a method and apparatus for iterative interference cancellation and channel estimation in a system based on FTN communication including a pilot. Interference of a pilot symbol on a data symbol is estimated, and the estimated interference is eliminated from a sequence of data symbols. When demodulation and channel decoding are performed on the sequence of data symbols, interference between data symbols and interference of a data symbol on a pilot symbol are estimated. Such estimation is repeatedly performed, and as FTN interference is repeatedly estimated and eliminated, channel estimation performance is improved, and through the improved channel estimation performance, the reception performance of the entire system is improved.

18 Claims, 9 Drawing Sheets

(56) References Cited

U.S. PATENT DOCUMENTS

| | | | | |
|---|---|---|---|---|
| 9,780,975 B1* | 10/2017 | Kwak | | H04L 25/03834 |
| 2012/0039380 A1* | 2/2012 | Schmitt | | H04L 7/0062 |
| | | | | 375/232 |
| 2014/0057637 A1* | 2/2014 | Hoang | | H04W 56/0045 |
| | | | | 455/445 |
| 2015/0237407 A1* | 8/2015 | Lee | | H04L 1/0071 |
| | | | | 725/68 |
| 2015/0263822 A1* | 9/2015 | Abdoli | | H04L 1/006 |
| | | | | 370/329 |
| 2016/0100393 A1* | 4/2016 | Takashima | | H04W 72/048 |
| | | | | 370/329 |
| 2016/0218908 A1* | 7/2016 | Baek | | H04J 11/0023 |
| 2016/0269049 A1* | 9/2016 | Kim | | H04L 1/0057 |
| 2017/0126348 A1* | 5/2017 | Pourahmadi | | H04J 13/0062 |
| 2017/0126451 A1* | 5/2017 | Kim | | H04L 5/0048 |

* cited by examiner

METHOD AND APPARATUS FOR ITERATIVE INTERFERENCE CANCELLATION AND CHANNEL ESTIMATION OF SYSTEM BASED ON FTN COMMUNICATION INCLUDING PILOT

CROSS REFERENCE TO RELATED APPLICATION

This application claims the benefit of Korean Patent Application No. 10-2017-0008849, filed Jan. 18, 2017, which is hereby incorporated by reference in its entirety into this application.

BACKGROUND OF THE INVENTION

1. Technical Field

The following embodiments relate generally to a method and apparatus for iterative interference cancellation and channel estimation, and more particularly to a method and apparatus for iterative interference cancellation and channel estimation in a system based on FTN communication including a pilot.

2. Description of the Related Art

In a Nyquist transmission method used in conventional broadcast systems and communication systems, the shape of pulses and transmission speed are determined so as to enable signals to be transmitted without Inter-Symbol Interference (ISI) in given bandwidth.

As a method for improving the transmission rate in a system using the Nyquist transmission method, there are a method of decreasing a pulse-shaping period, a method of raising a symbol modulation level, and the like.

However, decreasing a pulse-shaping period increases system bandwidth, and raising the symbol modulation level requires a higher Signal-to-Noise Ratio (SNR) for the same level of signal detection.

In order to overcome the limitations of existing transmission methods such as the Nyquist transmission method, a Faster-Than-Nyquist (FTN) transmission method, in which the transmission rate may be improved without using a higher modulation level in given bandwidth, is proposed.

The FTN transmission method is configured such that signals are transmitted with a shorter pulse-shaping period while maintaining a pulse shape, which is determined depending on bandwidth.

When signals are transmitted using the FTN transmission method, Inter-Symbol Interference (ISI) is necessarily generated in the transmitted signals. Here, ISI generated due to the FTN transmission method is called "FTN interference".

Such FTN interference deteriorates signal detection performance. Here, if the pattern of the FTN interference is known in advance, a receiver may reconstruct original signals using various interference cancellation methods.

As a method for eliminating FTN interference, a method in which interference cancellation and channel-decoding are repeatedly performed through interworking of an interference cancellation unit and a channel-decoding unit may be considered. This method has a structure in which the elimination of interference from a received signal sequence improves the performance of channel code and a channel-decoded sequence is used to further eliminate interference, whereby performance is gradually improved. Here, in order to use the channel-decoded sequence for interference cancellation, a method in which the prior probability of a received symbol sequence is applied depending on the configuration of an interference cancellation unit, a method in which FTN interference is estimated from a decoded signal sequence and is then eliminated, and the like may be considered.

Most wireless communication systems use pilot signals for channel estimation and initial system synchronization between a transmission unit and a reception unit.

Pilot signals are not signals for transmitting actual data. A transmission unit and a reception unit send and receive pilot signals appointed in advance therebetween, whereby coherent detection between the transmission unit and reception unit may be possible. Also, when the transmission unit and the reception unit send and receive pilot signals appointed in advance therebetween, the impact of a channel may be estimated and compensated for.

However, in a system using the FTN transmission method, pilot signals may be distorted due to FTN interference of data signals. When a pilot signal is distorted due to FTN interference, coherent detection in a receiver becomes difficult. Also, the distortion of a pilot signal affects channel estimation, which degrades the reception performance of the system.

Therefore, for a system based on FTN communication including a pilot, a method for minimizing channel estimation performance degradation resulting from interference is required.

SUMMARY OF THE INVENTION

An embodiment may provide an apparatus and method for performing interference cancellation and channel estimation for a system based on FTN communication including a pilot.

An embodiment may provide an apparatus and method for improving the utilization of frequencies by applying an FTN transmission method.

An embodiment may provide an apparatus and method in which the degradation of channel estimation performance, which arises from the distortion of a pilot, is minimized through iterative interference cancellation and channel estimation.

An embodiment may provide an apparatus and method for estimating FTN interference of a data symbol on a pilot symbol and eliminating the estimated FTN interference.

An embodiment may provide an apparatus and method for improving channel estimation performance by repeatedly estimating and eliminating FTN interference.

An embodiment may provide an apparatus and method for improving data symbol restoration performance through improved channel estimation performance.

An embodiment may provide an apparatus and method for improving the reception performance of an entire system by repeatedly estimating and eliminating FTN interference.

In an aspect, there is provided a method for processing a signal, which includes separating a received signal into a sequence of pilot symbols and a sequence of data symbols; and generating first estimated FTN interference and channel estimation information based on pilot FTN interference estimation and channel estimation using the sequence of pilot symbols, wherein the first estimated FTN interference is interference of a pilot symbol on a data symbol.

The method may further include generating a sequence of channel-compensated data symbols by compensating for a channel impact included in the received signal using the channel estimation information.

The method may further include eliminating the first estimated FTN interference from the sequence of the channel-compensated data symbols and thereby generating a sequence of data symbols from which the interference of the pilot symbol on the data symbol is eliminated.

The method may further include demodulating a sequence of data symbols from which FTN interference is eliminated, and thereby generating a Log-Likelihood Ratio (LLR) sequence from which interference is eliminated or a bit sequence from which interference is eliminated.

The method may further include performing channel decoding on the LLR sequence from which the interference is eliminated or the bit sequence from which the interference is eliminated, and thereby generating an LLR sequence, an error of which is corrected, or a bit sequence, an error of which is corrected.

The method may further include deinterleaving the LLR sequence from which the interference is eliminated or the bit sequence from which the interference is eliminated; and interleaving the LLR sequence, the error of which is corrected, or the bit sequence, the error of which is corrected.

The method may further include generating second estimated FTN interference and third estimated FTN interference using an LLR sequence, an error of which is corrected, or a bit sequence, an error of which is corrected.

The second estimated FTN interference may be interference between data symbols.

The third estimated FTN interference may be interference of a data symbol on a pilot symbol.

The method may further include applying a currently estimated channel, represented by the channel estimation information, to the third estimated FTN interference, and thereby generating FTN interference to which a channel is applied.

The method may further include eliminating the FTN interference to which the channel is applied from the sequence of the pilot symbols, and thereby generating a sequence of pilot symbols from which interference is eliminated.

Generating the second estimated FTN interference and the third estimated FTN interference may include generating an estimated data symbol sequence by modulating the LLR sequence, the error of which is corrected, or the bit sequence, the error of which is corrected.

Generating the second estimated FTN interference and the third estimated FTN interference may include generating a symbol sequence to which data is mapped by mapping the estimated data symbol sequence to a position corresponding to a data symbol of a symbol sequence and mapping a null symbol to a position corresponding to a pilot symbol of the symbol sequence.

Generating the second estimated FTN interference and the third estimated FTN interference may include generating a symbol sequence including FTN interference by performing pulse shaping on the symbol sequence to which the data is mapped.

Generating the second estimated FTN interference and the third estimated FTN interference may include generating estimated data FTN interference by eliminating the symbol sequence to which the data is mapped from the symbol sequence including the FTN interference.

Generating the second estimated FTN interference and the third estimated FTN interference may include generating the second estimated FTN interference and the third estimated FTN interference by separating the estimated data FTN interference.

The second estimated FTN interference may be interference at a position of a data symbol of the estimated data FTN interference.

The third estimated FTN interference may be interference at a position of a pilot symbol of the estimated data FTN interference.

Generating the first estimated FTN interference and the channel estimation information may be repeatedly performed.

At second or subsequent iterations of generating the first estimated FTN interference and the channel estimation information, a sequence of pilot symbols from which interference is eliminated may be input as the sequence of the pilot symbols.

Generating the first estimated FTN interference and the channel estimation information may include generating a symbol sequence to which a pilot is mapped by mapping a generated pilot to a position corresponding to a pilot symbol of a symbol sequence and mapping a null symbol to a position corresponding to a data symbol of the symbol sequence.

Generating the first estimated FTN interference and the channel estimation information may include generating a symbol sequence including FTN interference by performing pulse shaping on the symbol sequence to which the pilot is mapped.

Generating the first estimated FTN interference and the channel estimation information may include generating pilot estimation information and the first estimated FTN interference based on the symbol sequence including the FTN interference.

The FTN interference may correspond to estimation of interference generated in a process of transmitting and receiving a symbol using a transmission filter of a transmission device and a matched filter of a reception device.

Each of the transmission filter and the matched filter may be a Root Raised Cosine (RRC) filter.

The symbol sequence including the FTN interference may be generated by estimating FTN interference between symbols depending on a Raised Cosine (RC) filter coefficient value of the RRC filter.

A pilot symbol sequence of the symbol sequence including the FTN interference may be a symbol sequence in which FTN interference generated between neighboring pilot symbols is included.

A data symbol sequence of the symbol sequence including the FTN interference may be a symbol sequence in which only interference generated due to pilot symbols is included.

The symbol sequence including the FTN interference may be separated into a symbol sequence corresponding to a pilot symbol position and a symbol sequence corresponding to a data symbol position.

The symbol sequence corresponding to the data symbol position may represent the first estimated FTN interference.

In another aspect, there is provided a communication apparatus, which includes a symbol separation unit for separating a received signal into a sequence of pilot symbols and a sequence of data symbols; and a first estimation unit for generating first estimated FTN interference and channel estimation information based on pilot FTN interference estimation and channel estimation using the sequence of the pilot symbols, wherein the first estimated FTN interference is interference of a pilot symbol on a data symbol.

In a further aspect, there is provided a method for processing a signal, which includes generating a symbol sequence to which a pilot is mapped by mapping a generated pilot to a position corresponding to a pilot symbol of a symbol sequence and mapping a null symbol to a position corresponding to a data symbol of the symbol sequence; generating a symbol sequence including FTN interference by performing pulse shaping on the symbol sequence to which the pilot is mapped; and generating estimated FTN interference based on the symbol sequence including the FTN interference.

Additionally, other methods, devices, and systems for implementing the present invention and a computer-readable recording medium for recording a computer program for implementing the above-described methods are further provided.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
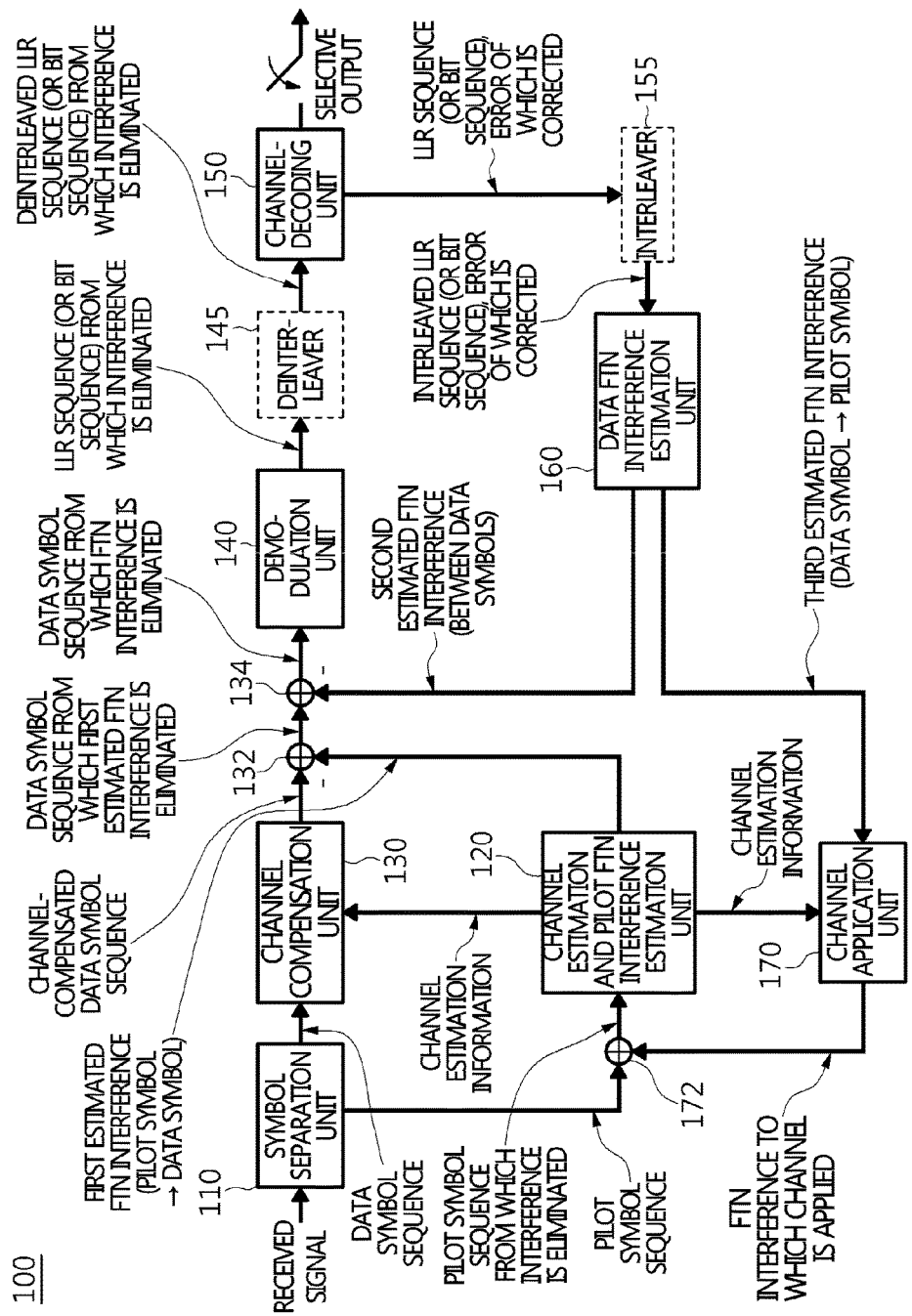
FIG. 1 is a block diagram of a communication apparatus according to an embodiment.

Specific embodiments will be described in detail below with reference to the attached drawings. These embodiments are described in sufficient detail to enable those skilled in the art to practice the present invention. It should be understood that the embodiments differ from each other, but the embodiments do not need to be exclusive of each other. For example, a particular feature, structure, or characteristic described herein in connection with one embodiment may be implemented in another embodiment without departing from the sprit and scope of the present invention. Also, it should be understood that the location or arrangement of individual elements in the disclosed embodiments may be changed without departing from the spirit and scope of the present invention. Therefore, the following detailed description is not to be taken in a limiting sense, and if appropriately interpreted, the scope of the exemplary embodiments is limited only by the appended claims, along with the full range of equivalents to which the claims are entitled.

The same reference numerals are used to designate the same or similar elements throughout the drawings. The shapes, sizes, etc. of components in the drawings may be exaggerated to make the description clear.

The terms used herein are for the purpose of describing particular embodiments only and are not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element, or intervening elements may be present.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Also, element modules described in the embodiments of the present invention are independently shown in order to indicate different characteristic functions, but this does not mean that each of the element modules is formed of a separate piece of hardware or software. That is, element modules are arranged and included for convenience of description, and at least two of the element units may form one element unit, or one element may be divided into multiple element units and the multiple element units may perform respective functions. An embodiment into which the elements are integrated or an embodiment from which some elements are removed is included in the scope of the present invention, as long as it does not depart from the essence of the present invention.

Also, in the present invention, some elements are not essential elements for performing essential functions, but may be optional elements for improving only performance. The present invention may be implemented using only essential elements for implementing the essence of the present invention, excluding elements used to improve only performance, and a structure including only essential elements, excluding optional elements used only to improve performance, is included in the scope of the present invention.

Hereinafter, embodiments of the present invention are described with reference to the accompanying drawings in order to describe the present invention in detail so that those having ordinary knowledge in the technical field to which the present invention pertains can easily practice the present invention. In the following description of the present invention, detailed descriptions of known functions and configurations which are deemed to make the gist of the present invention obscure will be omitted.

In embodiments, a method for iterative interference cancellation and channel estimation for a system based on FTN communication including a pilot is proposed. An FTN transmission method unavoidably causes inter-symbol interference. Accordingly, in the system based on FTN communication including a pilot, a pilot symbol may be distorted due to interference of a data symbol on the pilot symbol, and the distortion of a pilot symbol may result in inaccurate channel estimation. The degradation of channel estimation performance may degrade the reception performance of the entire FTN communication system. Therefore, a method for compensating for the distortion of channel estimation is required in order to minimize the effect of such interference or distortion. In order to compensate for the distortion of channel estimation, the FTN communication system of an embodiment may apply a reception structure based on iterative interference cancellation and channel decoding. Also, the FTN communication system performs channel estimation while repeatedly eliminating the FTN interference of a data symbol on a pilot symbol, whereby the reception performance of the FTN communication may be improved.

FIG. 1 is a block diagram of a communication apparatus according to an embodiment.

The communication apparatus 100 illustrated in FIG. 1 may perform iterative interference cancellation and channel estimation.

The communication apparatus 100 may include a symbol separation unit 110, a channel estimation and pilot FTN interference estimation unit 120, a channel compensation unit 130, a first interference cancellation unit 132, a second interference cancellation unit 134, a demodulation unit 140, a channel-decoding unit 150, a data FTN interference estimation unit 160, a channel application unit 170, and a third interference cancellation unit 172.

Also, the communication apparatus 100 may selectively further include a deinterleaver 145 and an interleaver 155.

The communication apparatus 100 may receive signals.

When a received signal is input to the communication apparatus 100, the symbol separation unit 110 may separate the received signal into a sequence of pilot symbols and a sequence of data symbols. The sequence of pilot symbols may be input to the channel estimation and pilot FTN interference estimation unit 120. The sequence of data symbols may be input to the channel compensation unit 130.

The channel estimation and pilot FTN interference estimation unit 120 may receive the sequence of pilot symbols, and may generate first estimated FTN interference and channel estimation information based on pilot FTN interference estimation and channel estimation using the sequence of pilot symbols.

The first estimated FTN interference may be interference of a pilot symbol on a data symbol.

The sequence of pilot symbols first received by the channel estimation and pilot FTN interference estimation unit 120 may be the sequence of pilot symbols that is output from the symbol separation unit 110. In other words, because the third interference cancellation unit 172 does not operate before the channel application unit 170 generates FTN interference to which a channel is applied, the sequence of pilot symbols output from the symbol separation unit 110 may be input to the channel estimation and pilot FTN interference estimation unit 120 without change.

Alternatively, the channel estimation and pilot FTN interference estimation unit 120 may receive a sequence of pilot symbols from which interference is eliminated, and may generate first estimated FTN interference and channel estimation information based on pilot FTN interference estimation and channel estimation using the sequence of pilot symbols from which interference is eliminated.

When the channel estimation and pilot FTN interference estimation unit 120 generates first estimated FTN interference and channel estimation information, other components of the communication apparatus 100 may operate, and the channel application unit 170 may generate FTN interference to which a channel is applied. The third interference cancellation unit 172 may generate a sequence of pilot symbols from which interference is eliminated, and the sequence of pilot symbols from which interference is eliminated may be input to the channel estimation and pilot FTN interference estimation unit 120.

The channel estimation and pilot FTN interference estimation unit 120 may be simply called a "first estimation unit 120".

The channel estimation and pilot FTN interference estimation unit 120 will be described in detail with reference to FIG. 2.

The channel compensation unit 130 may compensate the sequence of data symbols for a channel impact included in the received signal using the channel estimation information. The channel compensation unit 130 may generate a sequence of channel-compensated data symbols from the sequence of data symbols through the compensation for channel impact.

The first interference cancellation unit 132 eliminates the first estimated FTN interference from the sequence of channel-compensated data symbols, and may thereby generate a sequence of data symbols from which the first estimated FTN interference is eliminated, which is a sequence of data symbols from which interference of a pilot symbol on a data symbol is eliminated.

The second interference cancellation unit 134 eliminates second estimated FTN interference, output by the data FTN interference estimation unit 160, from the sequence of data symbols from which the first estimated FTN interference is eliminated, which is output from the first interference cancellation unit 132, thus generating a sequence of data symbols from which FTN interference is eliminated.

The second estimated FTN interference may be interference between data symbols, which is estimated by the data FTN interference estimation unit 160.

In the first channel estimation, the operation of the second interference cancellation unit 134 may not be applied. In other words, in the first channel estimation, the sequence of data symbols from which the first estimated FTN interference is eliminated may be output from the second interference cancellation unit 134 without change as a sequence of data symbols from which FTN interference is eliminated.

The sequence of data symbols from which FTN interference is eliminated may be input to the demodulation unit 140.

As described above, in the first channel estimation, the operation of the second interference cancellation unit 134 may not be applied. That is, in the first channel estimation, the sequence of data symbols from which only the first estimated FTN interference is eliminated may be input to the demodulation unit 140. After the first channel estimation has been performed, a sequence of data symbols from which FTN interference is eliminated may be input to the demodulation unit 140.

The demodulation unit 140 demodulates the sequence of data symbols from which FTN interference is eliminated, and may thereby generate a Log-Likelihood Ratio (LLR) sequence from which interference is eliminated or a bit sequence from which interference is eliminated.

The output of the demodulation unit 140 may be an LLR sequence or a bit sequence depending on the demodulation application method.

Selectively, the deinterleaver 145 may perform deinterleaving on the LLR sequence from which interference is eliminated or the bit sequence from which interference is eliminated. The deinterleaved LLR sequence from which interference is eliminated or the deinterleaved bit sequence from which interference is eliminated may be input to the channel-decoding unit 150.

The channel-decoding unit 150 performs channel decoding on the LLR sequence from which interference is eliminated or the bit sequence from which interference is eliminated, thereby correcting errors in the LLR sequence from which interference is eliminated or the bit sequence from which interference is eliminated. Some errors in the LLR sequence from which interference is eliminated or the bit sequence from which interference is eliminated may be corrected.

The channel-decoding unit 150 performs channel decoding on the LLR sequence from which interference is eliminated or the bit sequence from which interference is eliminated, and may thereby generate an LLR sequence, the error of which is corrected, or a bit sequence, the error of which is corrected.

The LLR sequence from which interference is eliminated or the bit sequence from which interference is eliminated, input to the channel-decoding unit 150, may be the deinterleaved LLR sequence from which interference is eliminated or the deinterleaved bit sequence from which interference is eliminated, which is output from the deinterleaver 145.

The channel-decoding unit 150 may check whether conditions for output are satisfied.

When the conditions for output are satisfied, the channel-decoding unit 150 may finally output the LLR sequence, the error of which is corrected, or the bit sequence, the error of which is corrected.

When the conditions for output are not satisfied, additional estimation and elimination of FTN interference are required. Accordingly, operations for estimation and elimination of FTN interference may be repeatedly performed.

Here, the conditions for output may include the degree of the estimated FTN interference, the degree of elimination of the FTN interference, the quality of the LLR sequence, the error of which is corrected, the quality of the bit sequence, the error of which is corrected, the number of repetitions of operations for eliminating FTN interference, and the like. Here, the FTN interference may include the first estimated FTN interference, the second estimated FTN interference, and the third estimated FTN interference.

Selectively, the interleaver 155 may perform interleaving on the LLR sequence, the error of which is corrected, or the bit sequence, the error of which is corrected. The interleaved LLR sequence, the error of which is corrected, or the interleaved bit sequence, the error of which is corrected, may be input to the data FTN interference estimation unit 160.

The data FTN interference estimation unit 160 may receive the LLR sequence, the error of which is corrected, or the bit sequence, the error of which is corrected, and may estimate FTN interference caused by data symbols using the LLR sequence, the error of which is corrected, or the bit sequence, the error of which is corrected.

The LLR sequence, the error of which is corrected, or the bit sequence, the error of which is corrected, input to the data FTN interference estimation unit 160, may be the interleaved LLR sequence, the error of which is corrected, or the interleaved bit sequence, the error of which is corrected, which is output from the interleaver 155.

The FTN interference caused by data symbols may include second estimated FTN interference and third estimated FTN interference.

The data FTN interference estimation unit 160 may generate second estimated FTN interference and third estimated FTN interference using the LLR sequence, the error of which is corrected, or the bit sequence, the error of which is corrected.

The second estimated FTN interference may be interference between data symbols. The third estimated FTN interference may be interference of a data symbol on a pilot symbol.

The second estimated FTN interference may be output to the second interference cancellation unit 134. The third estimated FTN interference may be output to the channel application unit 170.

The data FTN interference estimation unit 160 may be simply called a "second interference estimation unit 160".

The data FTN interference estimation unit 160 will be described in more detail with reference to FIG. 4.

The second interference cancellation unit 134 may repeatedly eliminate interference between data symbols from the sequence of channel-compensated data symbols. That is, the output of the second interference cancellation unit 134 may be used as the input of a reception structure for repeatedly estimating and eliminating interference. As interference between data symbols is repeatedly eliminated, signal detection performance may be gradually improved.

When interference of a data symbol on a pilot symbol is eliminated from a sequence of pilot symbols, channel estimation performance may be improved. The sequence of pilot symbols output from the symbol separation unit 110 may have a distorted state due to the effect of a channel. Accordingly, it is necessary to eliminate estimated interference in consideration of the effect of the channel.

The channel application unit 170 may apply a currently estimated channel to the third estimated FTN interference.

The channel application unit 170 applies the currently estimated channel, represented by the channel estimation information, to the third estimated FTN interference, and may thereby generate FTN interference to which the channel is applied.

The third interference cancellation unit 172 eliminates the FTN interference to which the channel is applied from the sequence of pilot symbols, and may thereby generate a sequence of pilot symbols from which interference is eliminated.

Through the above-described operations, a pilot symbol and a sequence of pilot symbols from which some data FTN interference is eliminated may be acquired.

In the first channel estimation, a channel may be estimated without considering FTN interference of a data symbol on a pilot symbol. Because a channel is estimated without consideration of FTN interference of a data symbol on a pilot symbol, channel estimation performance may be degraded due to the distortion of the pilot symbol. Meanwhile, when FTN interference including FTN interference of a data symbol on a pilot symbol is eliminated through the above-described operations, channel estimation performance may be improved. Also, thanks to the improved channel estimation performance, a sequence of data symbols in which a channel is more accurately compensated for may be acquired. Accordingly, data symbols may be more accurately restored, and thus interference on a pilot symbol may be more accurately estimated again.

In other words, with the repetition of the above-mentioned operations, channel estimation performance and data symbol restoration performance may be alternately improved, and consequently, the reception performance of the communication apparatus 100 may be improved.

Figure 2:
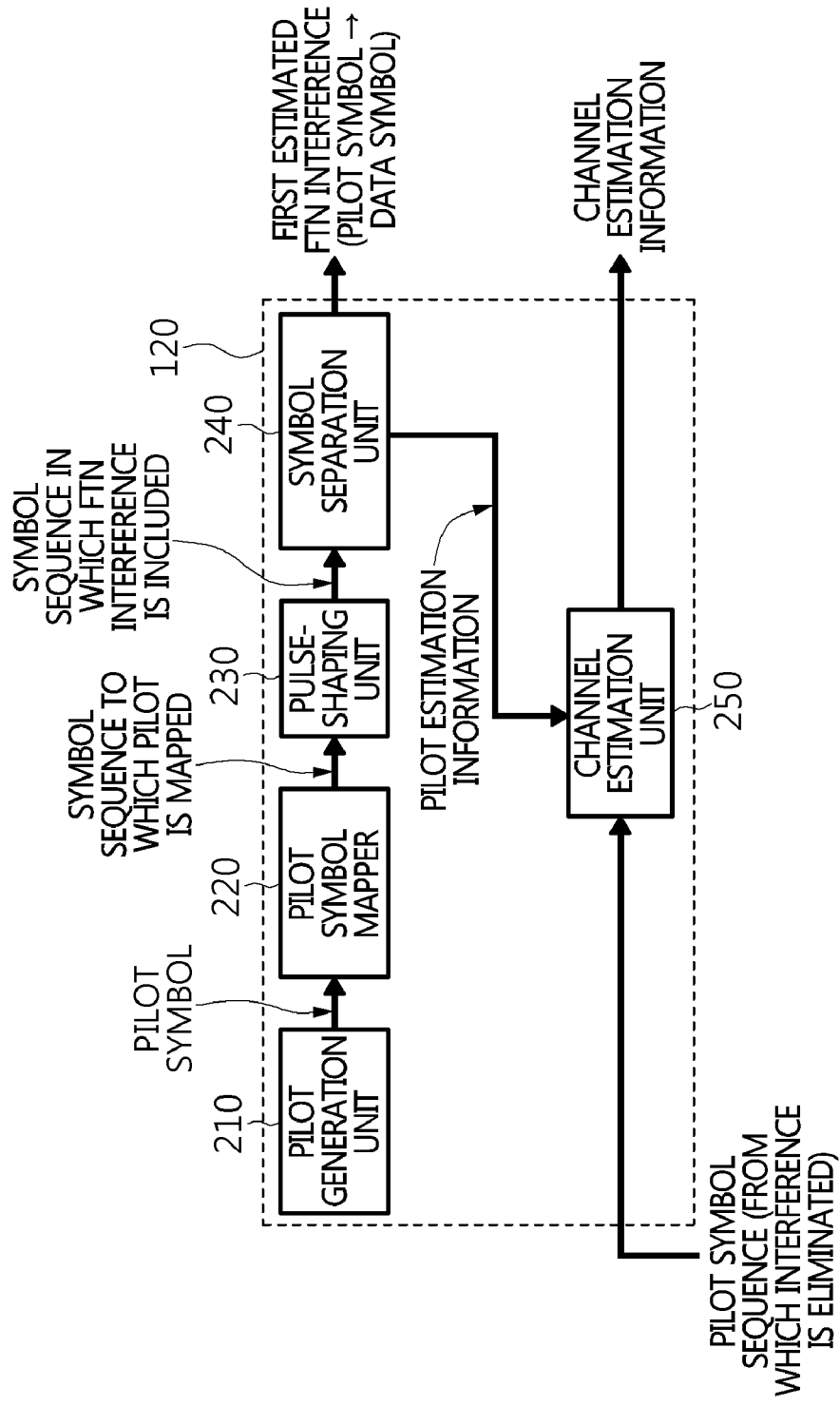
FIG. 2 is a block diagram of a channel estimation and pilot FTN interference estimation unit according to an embodiment.

FIG. 2 is a block diagram of a channel estimation and pilot FTN interference estimation unit according to an embodiment.

The channel estimation and pilot FTN interference estimation unit 120 may include a pilot generation unit 210, a pilot symbol mapper 220, a pulse-shaping unit 230, a symbol separation unit 240 and a channel estimation unit 250.

The pilot generation unit 210 may generate a predefined pilot symbol. The predefined pilot symbol may be a pilot symbol appointed between a transmission device and a reception device. The reception device may be the communication apparatus 100.

The pilot symbol mapper 220 may map the generated pilot symbol to the position corresponding to a pilot symbol of an entire symbol sequence, and may map a null symbol to the position corresponding to a data symbol of the entire symbol sequence.

The pilot symbol mapper 220 may generate a symbol sequence to which a pilot is mapped by mapping the generated pilot symbol to the position corresponding to the pilot symbol of a symbol sequence and mapping a null symbol to the position corresponding to the data symbol of the symbol sequence.

The pulse-shaping unit 230 may perform pulse shaping on the symbol sequence to which the pilot is mapped.

The pulse-shaping unit 230 may receive the symbol sequence to which the pilot is mapped and output a symbol sequence including FTN interference.

The pulse-shaping unit 230 may estimate FTN interference generated in the process of transmitting and receiving a symbol using the transmission filter of the transmission device and the matched filter of the reception device. The pulse-shaping unit 230 may generate a symbol including FTN interference or a symbol sequence including FTN interference using the estimated FTN interference.

Each of the transmission filter and the matched filter may be a Root Raised Cosine (RRC) filter. The pulse-shaping unit 230 estimates FTN interference between symbols depending on the Raised Cosine (RC) filter coefficient value of the RRC filter, and may thereby output a symbol including FTN interference or a symbol sequence including FTN interference.

When the symbol sequence to which the pilot is mapped, which is output from the pilot symbol mapper 220, is input to the pulse-shaping unit 230, the pilot symbol sequence of the input symbol sequence may be output as a symbol sequence in which FTN interference generated between neighboring pilot symbols is included. Because the data symbol sequence of the input symbol sequence is the sequence of null symbols, the data symbol sequence may be output as a symbol sequence in which only interference generated due to pilot symbols is included.

In other words, in the symbol sequence including FTN interference, the pilot symbol sequence may be a symbol sequence in which FTN interference generated between neighboring pilot symbols is included, and the data symbol sequence may be a symbol sequence in which only interference generated due to pilot symbols is included.

Alternatively, a pilot symbol sequence to which FTN interference is applied may be present at the pilot symbol position of the symbol sequence including FTN interference, and FTN interference of a pilot symbol on a data symbol may be present at the data symbol position of the symbol sequence including FTN interference.

Figure 3:
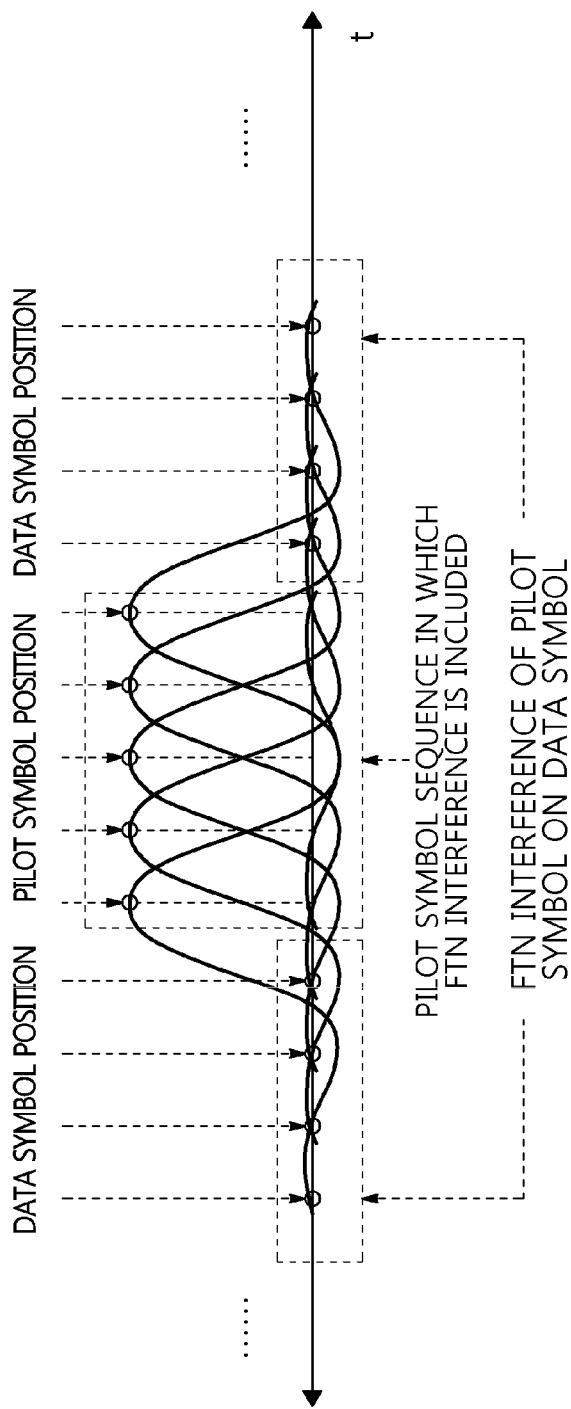
FIG. 3 shows a symbol sequence including FTN interference, output from the pulse-shaping unit of a channel estimation and pilot FTN interference estimation unit according to an embodiment.

The symbol sequence including FTN interference, which is output from the pulse-shaping unit 230, is shown in FIG. 3.

The symbol separation unit 240 may generate pilot estimation information and first estimated FTN interference based on the symbol sequence including FTN interference.

The symbol separation unit 240 may separate the symbol sequence including FTN interference into a symbol sequence corresponding to the pilot symbol position and a symbol sequence corresponding to the data symbol position.

The symbol sequence corresponding to the pilot symbol position may be a pilot symbol sequence in which FTN interference is included. The pilot estimation information may be the pilot symbol sequence in which FTN interference is included. Alternatively, the pilot estimation information may be information generated based on the pilot symbol sequence in which FTN interference is included.

The symbol sequence corresponding to the data symbol position may represent the first estimated FTN interference. As described above, the first estimated FTN interference may be interference of a pilot symbol on a data symbol.

As described above, the first estimated FTN interference corresponding to the data symbol position may be eliminated from a sequence of channel-compensated data symbols.

Because the first estimated FTN interference is interference caused by the predefined pilot symbol sequence, the first estimated FTN interference may be acquired through computation by the communication apparatus 100, and may be eliminated through computation.

The channel estimation unit 250 may generate channel estimation information using the pilot estimation information. The channel estimation information may be reference pilot information for channel estimation.

Various methods for generating channel estimation information based on pilot estimation information may be used by the channel estimation unit 250.

FIG. 3 shows a symbol sequence including FTN interference, which is output from the pulse-shaping unit of a channel estimation and pilot FTN interference estimation unit according to an embodiment.

FIG. 3 shows a symbol sequence in which a pilot symbol sequence to which FTN interference is applied is present at a pilot symbol position and in which FTN interference of a pilot symbol on a data symbol is present at a data symbol position.

Figure 4:
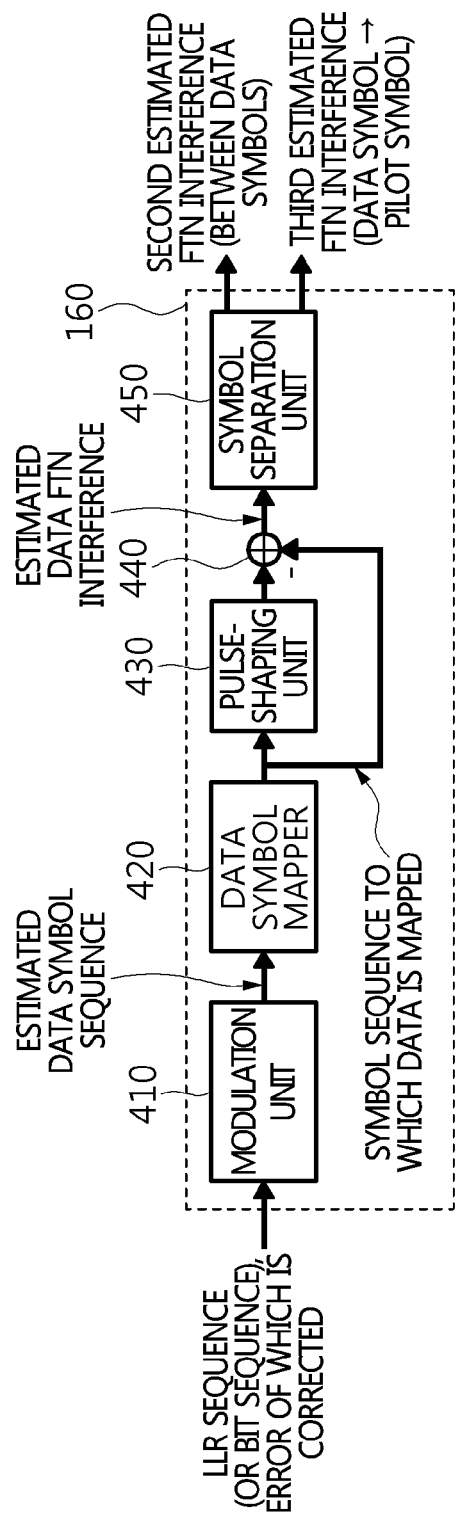
FIG. 4 is a block diagram of a data FTN interference estimation unit according to an embodiment.

FIG. 4 is a block diagram of a data FTN interference estimation unit according to an embodiment.

The data FTN interference estimation unit 160 may include a modulation unit 410, a data symbol mapper 420, a pulse-shaping unit 430, a symbol sequence elimination unit 440 and a symbol separation unit 450.

An LLR sequence, the error of which is corrected, or a bit sequence, the error of which is corrected, may be input to the modulation unit 410.

The modulation unit 410 may modulate the LLR sequence, the error of which is corrected, or the bit sequence, the error of which is corrected, to symbols. The modulation unit 410 modulates the LLR sequence, the error of which is corrected, or the bit sequence, the error of which is corrected, and may thereby generate an estimated data symbol sequence.

The data symbol mapper 420 may map the estimated data symbol sequence to the position corresponding to the data symbol of an entire symbol sequence, and may map a null symbol to the position corresponding to the pilot symbol of the entire symbol sequence.

The data symbol mapper 420 may generate a symbol sequence to which data is mapped by mapping the estimated data symbol sequence to the position corresponding to the data symbol of an entire symbol sequence and mapping a null symbol to the position corresponding to the pilot symbol of the entire symbol sequence.

The pulse-shaping unit 430 may perform pulse shaping on the symbol sequence to which the data is mapped.

The pulse-shaping unit 430 may correspond to the pulse-shaping unit 230, which has been described with reference to FIG. 2.

The pulse-shaping unit 430 may receive the symbol sequence to which the data is mapped, and may output a symbol sequence including FTN interference. Here, the FTN interference may be data FTN interference.

The pulse-shaping unit 430 may estimate FTN interference generated in the process of transmitting and receiving a symbol using the transmission filter of a transmission device and the matched filter of a reception device. The pulse-shaping unit 430 may generate a symbol including FTN interference or a symbol sequence including FTN interference using the estimated FTN interference.

Each of the transmission filter and the matched filter may be an RRC filter. The pulse-shaping unit 430 estimates FTN interference between symbols depending on the RC filter coefficient value of the RRC filter, and may thereby output the symbol including FTN interference or the symbol sequence including FTN interference.

When the symbol sequence to which the data is mapped, which is output from the data symbol mapper 420, is input to the pulse-shaping unit 430, the data symbol sequence of the input symbol sequence may be output as a symbol sequence in which FTN interference generated between neighboring data symbols is included. Because the pilot symbol sequence of the input symbol sequence is the sequence of null symbols, the pilot symbol sequence may be output as a symbol sequence in which only interference generated due to data symbols is included.

In other words, the output of the pulse-shaping unit 430 may be a symbol sequence in which a data symbol sequence to which FTN interference is applied is present at the data symbol position and in which FTN interference of a data symbol on a pilot symbol is present at the pilot symbol position.

Figure 5:
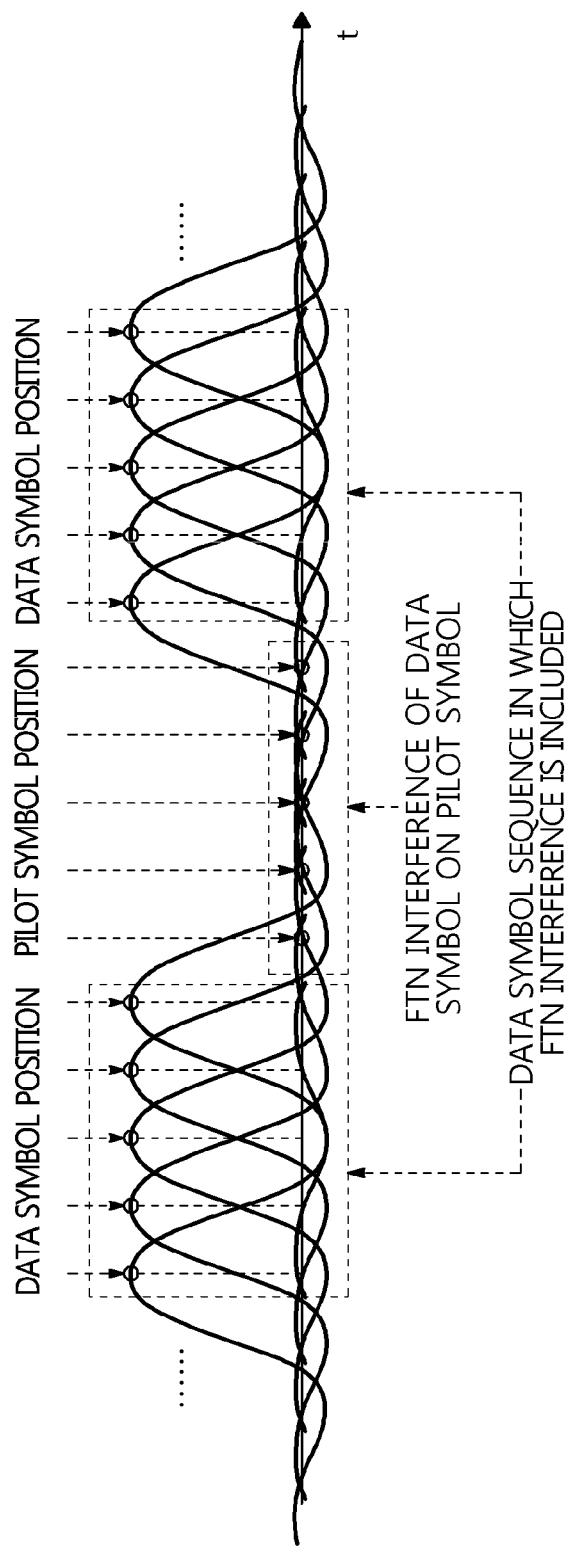
FIG. 5 shows a symbol sequence including FTN interference, output from the pulse-shaping unit of a data FTN interference estimation unit according to an embodiment.

The symbol sequence including FTN interference, which is output from the pulse-shaping unit 430, is shown in FIG. 5.

The symbol sequence elimination unit 440 may eliminate the symbol sequence to which the data is mapped, which is the output of the data symbol mapper 420, from the symbol sequence including FTN interference, which is the output of the pulse-shaping unit 430.

The symbol sequence elimination unit 440 eliminates the symbol sequence to which the data is mapped from the symbol sequence including FTN interference, and may thereby generate estimated data FTN interference.

The estimated data FTN interference may be input to the symbol separation unit 450.

The symbol separation unit 450 separates the pilot symbol position of the estimated data FTN interference from the data symbol position thereof, and may thereby separate the estimated data FTN interference into interference between data symbols and interference of a data symbol on a pilot symbol.

The symbol separation unit 450 may output the interference between data symbols and the interference of a data symbol on a pilot symbol.

The interference between data symbols may be output to the second interference cancellation unit 134. The interference of a data symbol on a pilot symbol may be output to the channel application unit 170.

FIG. 5 shows a symbol sequence including FTN interference, which is output from the pulse-shaping unit of a data FTN interference estimation unit according to an embodiment.

FIG. 5 shows a symbol sequence in which a data symbol sequence to which FTN interference is applied is present at the data symbol position and in which FTN interference of a data symbol on a pilot symbol is present at the pilot symbol position.

Figure 6:
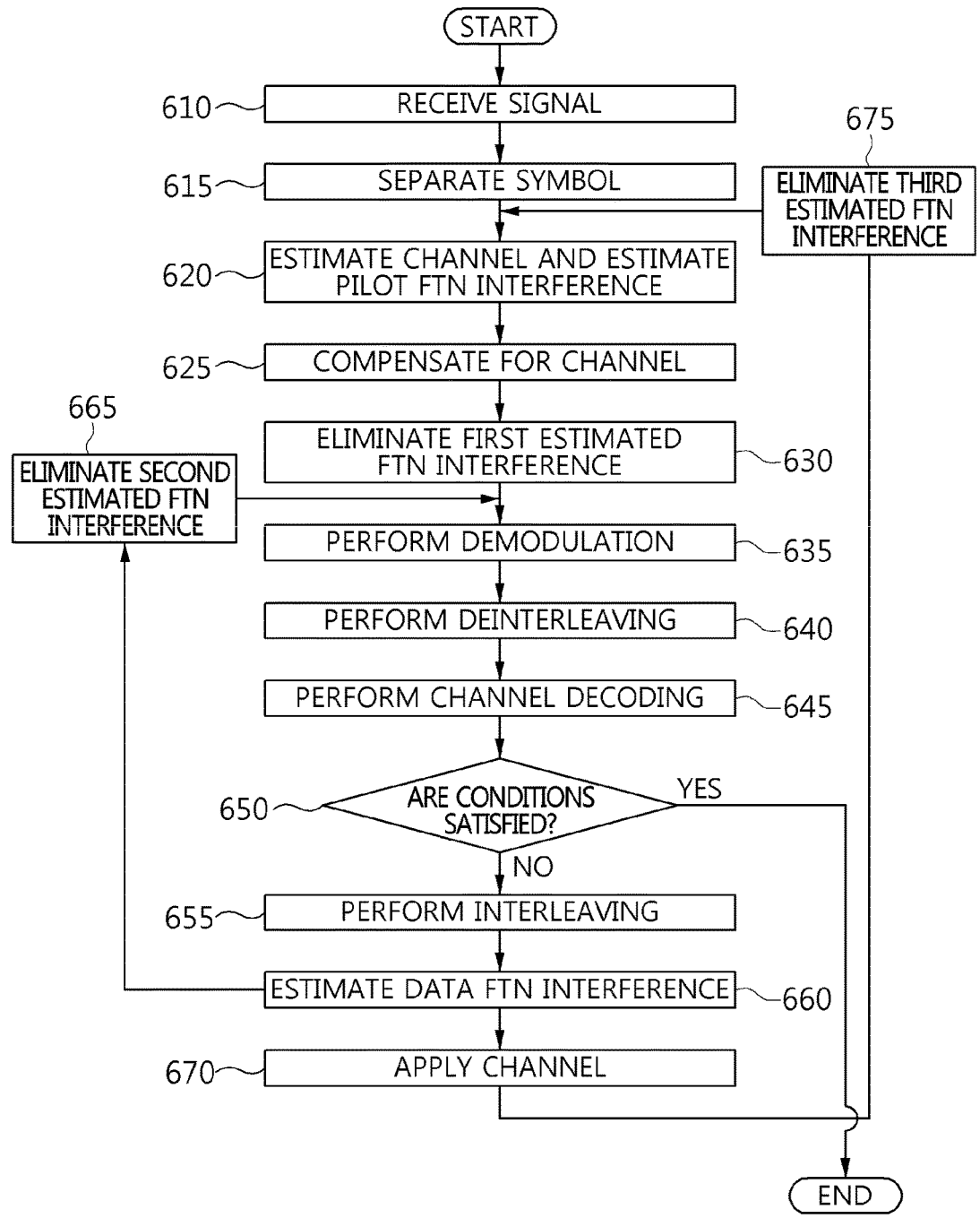
FIG. 6 is a flowchart of a method for processing a signal according to an embodiment.

FIG. 6 is a flowchart of a method for processing a signal according to an embodiment.

At step 610, the communication apparatus 100 may receive a signal.

At step 615, the received signal may be separated into a sequence of pilot symbols and a sequence of data symbols.

When the received signal is input to the communication apparatus 100, a symbol separation unit 110 may separate the received signal into a sequence of pilot symbols and a sequence of data symbols.

The sequence of pilot symbols may be used as the input of a channel estimation and pilot FTN interference estimation unit 120. The sequence of data symbols may be used as the input of a channel compensation unit 130.

At step 620, first estimated FTN interference and channel estimation information may be generated based on pilot FTN interference estimation and channel estimation using the sequence of pilot symbols or the sequence of pilot symbols from which interference is eliminated.

The first estimated FTN interference may be interference of a pilot symbol on a data symbol.

At the first iteration of step 620, first estimated FTN interference and channel estimation information may be generated based on pilot FTN interference estimation and channel estimation using the sequence of pilot symbols.

At the first iteration of step 620, the channel estimation and pilot FTN interference estimation unit 120 may receive a sequence of pilot symbols and generate first estimated FTN interference and channel estimation information based on pilot FTN interference estimation and channel estimation using the sequence of pilot symbols.

At the first iteration of step 620, because steps 625, 630, 635, 640, 645, 650, 655, 660, 665, 670 and 675 have not been performed yet, a third interference cancellation unit 172 does not operate, and the input of the channel estimation and pilot FTN interference estimation unit 120 may be the sequence of pilot symbols output from the symbol separation unit 110.

At the second and subsequent iterations of step 620, first estimated FTN interference and channel estimation information may be generated based on pilot FTN interference estimation and channel estimation using a sequence of pilot symbols from which interference is eliminated.

At the second and subsequent iterations of step 620, the channel estimation and pilot FTN interference estimation unit 120 may receive a sequence of pilot symbols from which interference is eliminated and may generate first estimated FTN interference and channel estimation information based on pilot FTN interference estimation and channel estimation using the sequence of pilot symbols from which interference is eliminated.

When the first estimated FTN interference and the channel estimation information are generated at the first iteration of step 620, steps 625, 630, 635, 640, 645, 650, 655, 660,

665, 670 and 675 may be performed. A channel application unit 170 may generate FTN interference to which a channel is applied. The third interference cancellation unit 172 may generate a sequence of pilot symbols from which interference is eliminated, and the input of the channel estimation and pilot FTN interference estimation unit 120 may be the sequence of pilot symbols from which interference is eliminated, which is output from the third interference cancellation unit 172.

At step 625, the sequence of data symbols is compensated for a channel impact included in the received signal using the channel estimation information, whereby a sequence of channel-compensated data symbols may be generated.

The channel compensation unit 130 may compensate the sequence of data symbols for a channel impact included in the received signal using the channel estimation information. The channel compensation unit 130 may generate a sequence of channel-compensated data symbols from the sequence of data symbols through the compensation for the channel impact.

At step 630, the first estimated FTN interference is eliminated from the sequence of channel-compensated data symbols, whereby a sequence of data symbols from which interference of a pilot symbol on a data symbol is eliminated may be generated.

A first interference cancellation unit 132 eliminates the first estimated FTN interference from the sequence of channel-compensated data symbols, thus generating a symbol sequence from which the first estimated FTN interference is eliminated, which is a sequence of data symbols from which interference of a pilot symbol on a data symbol is eliminated.

At step 635, the sequence of data symbols from which FTN interference is eliminated is demodulated, whereby a Log-Likelihood Ratio (LLR) sequence from which interference is eliminated or a bit sequence from which interference is eliminated may be generated.

A demodulation unit 140 demodulates the sequence of data symbols from which FTN interference is eliminated, and may thereby generate an LLR sequence from which interference is eliminated or a bit sequence from which interference is eliminated.

The output of the demodulation unit 140 may be an LLR sequence or a bit sequence depending on the demodulation application method.

At the first iteration of step 635, the operation of a second interference cancellation unit 134 may not be applied. That is, in the first channel estimation, the sequence of data symbols from which the first estimated FTN interference is eliminated may be output from the second interference cancellation unit 134 without change. Also, the demodulation unit 140 may receive the sequence of data symbols from which the first estimated FTN interference is eliminated. The demodulation unit 140 demodulates the sequence of data symbols from which the first estimated FTN interference is eliminated, and may thereby generate an LLR sequence from which interference is eliminated or a bit sequence from which interference is eliminated.

At the second and subsequent iterations of step 635, the second interference cancellation unit 134 may additionally eliminate second estimated FTN interference from the sequence of data symbols from which the first estimated FTN interference is eliminated. That is, after the first channel estimation has been performed, the sequence of data symbols from which FTN interference is eliminated may be output from the second interference cancellation unit 134. The sequence of data symbols from which FTN interference is eliminated may be a sequence of data symbols acquired in such a way that the first estimated FTN interference and the second estimated FTN interference are eliminated from the sequence of channel-compensated data symbols.

Also, the demodulation unit 140 may receive the sequence of data symbols from which FTN interference is eliminated. The demodulation unit 140 demodulates the sequence of data symbols from which FTN interference is eliminated, and may thereby generate an LLR sequence from which interference is eliminated or a bit sequence from which interference is eliminated.

At step 640, deinterleaving may be performed on the LLR sequence from which interference is eliminated or the bit sequence from which interference is eliminated.

Step 640 may be optional.

A deinterleaver 145 may perform deinterleaving on the LLR sequence from which interference is eliminated or the bit sequence from which interference is eliminated. The deinterleaved LLR sequence from which interference is eliminated or the deinterleaved bit sequence from which interference is eliminated may be input to a channel-decoding unit 150.

At step 645, channel decoding is performed on the LLR sequence from which interference is eliminated or the bit sequence from which interference is eliminated, whereby an LLR sequence, the error of which is corrected, or a bit sequence, the error of which is corrected, may be generated.

The channel-decoding unit 150 performs channel decoding on the LLR sequence from which interference is eliminated or the bit sequence from which interference is eliminated, and may thereby correct errors in the LLR sequence from which interference is eliminated or in the bit sequence from which interference is eliminated. Some of the errors in the LLR sequence from which interference is eliminated or in the bit sequence from which interference is eliminated may be corrected.

The channel-decoding unit 150 may generate an LLR sequence, the error of which is corrected, or a bit sequence, the error of which is corrected, by performing channel decoding on the LLR sequence from which interference is eliminated or the bit sequence from which interference is eliminated.

The LLR sequence from which interference is eliminated or the bit sequence from which interference is eliminated, input to the channel-decoding unit 150, may be the deinterleaved LLR sequence from which interference is eliminated or the deinterleaved bit sequence from which interference is eliminated, which is output at step 640.

At step 650, the channel-decoding unit 150 may check whether conditions for output are satisfied.

When the conditions for output are satisfied, the channel-decoding unit 150 may finally output the LLR sequence, the error of which is corrected, or the bit sequence, the error of which is corrected.

When the conditions for output are not satisfied, because additional estimation and elimination of FTN interference are required, steps 655, 660, 665, 670, 675, 620, 625, 630, 635 and 640 may be repeated.

Here, the conditions for output may include the degree of the estimated FTN interference, the degree of elimination of the FTN interference, the quality of the LLR sequence, the error of which is corrected, the quality of the bit sequence, the error of which is corrected, and the number of iterations of steps 655, 660, 665, 670, 675, 620, 625, 630, 635 and 640. Here, the FTN interference may include the first estimated FTN interference, the second estimated FTN interference, and the third estimated FTN interference.

At step 655, interleaving may be performed on the LLR sequence, the error of which is corrected, or the bit sequence, the error of which is corrected.

Step 655 may be optional.

An interleaver 155 may perform interleaving on the LLR sequence, the error of which is corrected, or the bit sequence, the error of which is corrected. The interleaved LLR sequence, the error of which is corrected, or the interleaved bit sequence, the error of which is corrected, may be input to a data FTN interference estimation unit 160.

At step 660, FTN interference caused due to data symbols may be estimated using the LLR sequence, the error of which is corrected, or the bit sequence, the error of which is corrected.

The LLR sequence, the error of which is corrected, or the bit sequence, the error of which is corrected, which is input to the data FTN interference estimation unit 160, may be the interleaved LLR sequence, the error of which is corrected, or the interleaved bit sequence, the error of which is corrected, which is output at step 655.

The FTN interference caused due to data symbols may include second estimated FTN interference and third estimated FTN interference.

The data FTN interference estimation unit 160 may generate second estimated FTN interference and third estimated FTN interference using the LLR sequence, the error of which is corrected, or the bit sequence, the error of which is corrected.

The second estimated FTN interference may be interference between data symbols. The third estimated FTN interference may be interference of a data symbol on a pilot symbol.

The second estimated FTN interference may be output to the second interference cancellation unit 134. The third estimated FTN interference may be output to the channel application unit 170.

At step 665, the second estimated FTN interference is eliminated from the sequence of data symbols from which the first estimated FTN interference is eliminated, whereby a sequence of data symbols from which FTN interference is eliminated may be generated.

The second interference cancellation unit 134 eliminates the second estimated FTN interference, output by the data FTN interference estimation unit 160, from the sequence of data symbols from which the first estimated FTN interference is eliminated, which is output from the first interference cancellation unit 132, thereby generating a sequence of data symbols from which FTN interference is eliminated.

The second interference cancellation unit 134 may repeatedly eliminate interference between data symbols from the sequence of channel-compensated data symbols. That is, the output of the second interference cancellation unit 134 may be used as the input of a reception structure for repeatedly performing estimation and elimination of interference. As interference between data symbols is repeatedly eliminated, signal detection performance may be gradually improved.

At step 670, a currently estimated channel, represented by the channel estimation information, is applied to the third estimated FTN interference, whereby FTN interference to which a channel is applied may be generated.

The channel application unit 170 may apply the currently estimated channel to the third estimated FTN interference.

The channel application unit 170 applies the currently estimated channel, represented by the channel estimation information, to the third estimated FTN interference, and may thereby generate FTN interference to which the channel is applied.

At step 675, the FTN interference to which the channel is applied is eliminated from the sequence of pilot symbols, whereby a sequence of pilot symbols from which interference is eliminated may be generated.

Steps 620, 625, 630, 635, 640, 645, 650, 655, 660, 665, 670 and 675 may be repeatedly performed.

Step 620 may be repeatedly performed, and at the second or subsequent iterations of step 620, the sequence of pilot symbols from which interference is eliminated may be input to the channel estimation and pilot FTN interference estimation unit 120 as a sequence of pilot symbols.

At the first iterations of steps 620, 625, 630, 635, 640, 645, 650, 655, 660, 665, 670 and 675, a channel may be estimated without consideration of FTN interference of a data symbol on a pilot symbol. Because a channel is estimated without consideration of FTN interference of a data symbol on a pilot symbol, channel estimation performance may be degraded due to the distortion of the pilot symbol. On the other hand, FTN interference including FTN interference of a data symbol on a pilot symbol is eliminated through the repetition of steps 620, 625, 630, 635, 640, 645, 650, 655, 660, 665, 670 and 675, whereby the channel estimation performance may be improved. Also, thanks to the improved channel estimation performance, a sequence of data symbols in which a channel is more accurately compensated for may be acquired. Accordingly, a data symbol is also more accurately restored, and as the result, interference on the pilot symbol is more accurately estimated again.

Figure 7:
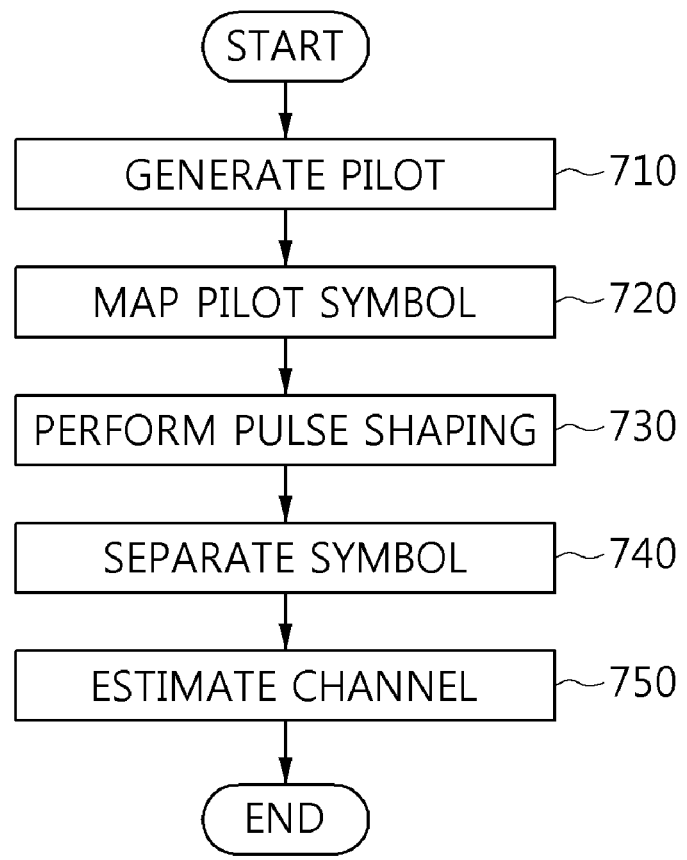
FIG. 7 is a flowchart of a method for estimating a channel and pilot FTN interference according to an embodiment.

FIG. 7 is a flowchart of a method for estimating a channel and pilot FTN interference according to an embodiment.

Step 620, having been described with reference to FIG. 6, may include steps 710, 720, 730, 740 and 750.

At step 710, a predefined pilot symbol may be generated.

A pilot generation unit 210 may generate a predefined pilot symbol. The predefined pilot symbol may be a pilot symbol appointed between a transmission device and a reception device. The reception device may be the communication apparatus 100.

At step 720, the generated pilot symbol is mapped to a position corresponding to the pilot symbol of a symbol sequence, and a null symbol is mapped to a position corresponding to the data symbol of the symbol sequence, whereby a symbol sequence to which a pilot is mapped may be generated.

A pilot symbol mapper 220 may map the generated pilot symbol to the position corresponding to a pilot symbol of an entire symbol sequence, and may map a null symbol to the position corresponding to a data symbol of the entire symbol sequence.

The pilot symbol mapper 220 may generate a symbol sequence to which a pilot is mapped by mapping the generated pilot symbol to the position corresponding to the pilot symbol of a symbol sequence and mapping a null symbol to the position corresponding to the data symbol of the symbol sequence.

At step 730, pulse-shaping is performed on the symbol sequence to which the pilot is mapped, whereby a symbol sequence including FTN interference may be generated.

A pulse-shaping unit 230 may perform pulse shaping on the symbol sequence to which the pilot is mapped.

The pulse-shaping unit 230 may receive the symbol sequence to which the pilot is mapped and output a symbol sequence including FTN interference.

Here, the FTN interference may correspond to estimation of interference generated in the process of transmitting and receiving a symbol using the transmission filter of the transmission device and the matched filter of the reception device.

The pulse-shaping unit 230 may estimate FTN interference generated in the process of transmitting and receiving a symbol using the transmission filter of the transmission device and the matched filter of the reception device. The pulse-shaping unit 230 may generate a symbol including FTN interference or a symbol sequence including FTN interference using the estimated FTN interference.

Each of the transmission filter and the matched filer may be a Root Raised Cosine (RRC) filter. The pulse-shaping unit 230 estimates FTN interference between symbols depending on the Raised Cosine (RC) filter coefficient value of the RRC filter, and may thereby output the symbol including FTN interference or the symbol sequence including FTN interference. That is, the symbol sequence including FTN interference may be generated by estimating FTN interference between symbols depending on the RC filter coefficient value of the RRC filter.

When the symbol sequence to which the pilot is mapped, which is the output of the pilot symbol mapper 220, is input to the pulse-shaping unit 230, the pilot symbol sequence of the input symbol sequence may be output as a symbol sequence in which FTN interference generated between neighboring pilot symbols is included. Because the data symbol sequence of the input symbol sequence is the sequence of null symbols, the data symbol sequence may be output as a symbol sequence in which only interference generated due to pilot symbols is included.

In other words, in the symbol sequence including FTN interference, the pilot symbol sequence may be a symbol sequence in which FTN interference generated between neighboring pilot symbols is included, and the data symbol sequence may be a symbol sequence in which only interference generated due to pilot symbols is included.

At step 740, pilot estimation information and first estimated FTN interference may be generated based on the symbol sequence including FTN interference.

A symbol separation unit 240 may generate pilot estimation information and first estimated FTN interference based on the symbol sequence including FTN interference.

The symbol separation unit 240 may separate the symbol sequence including FTN interference into a symbol sequence corresponding to the pilot symbol position and a symbol sequence corresponding to the data symbol position.

The symbol sequence corresponding to the pilot symbol position may be a pilot symbol sequence in which FTN interference is included. The pilot estimation information may be the pilot symbol sequence in which FTN interference is included. Alternatively, the pilot estimation information may be information generated based on the pilot symbol sequence in which FTN interference is included.

The symbol sequence corresponding to the data symbol position may represent the first estimated FTN interference. As described above, the first estimated FTN interference may be interference of a pilot symbol on a data symbol.

As described above, the first estimated FTN interference corresponding to the data symbol position may be eliminated from the sequence of channel-compensated data symbols.

Because the first estimated FTN interference is interference generated due to the predefined pilot symbol sequence, the first estimated FTN interference may be acquired through computation by the communication apparatus 100 and may be eliminated through computation.

At step 750, channel estimation information may be generated using the pilot estimation information.

A channel estimation unit 250 may generate channel estimation information using the pilot estimation information. The channel estimation information may be reference pilot information for channel estimation.

Various methods for generating channel estimation information based on pilot estimation information may be used by the channel estimation unit 250.

Figure 8:
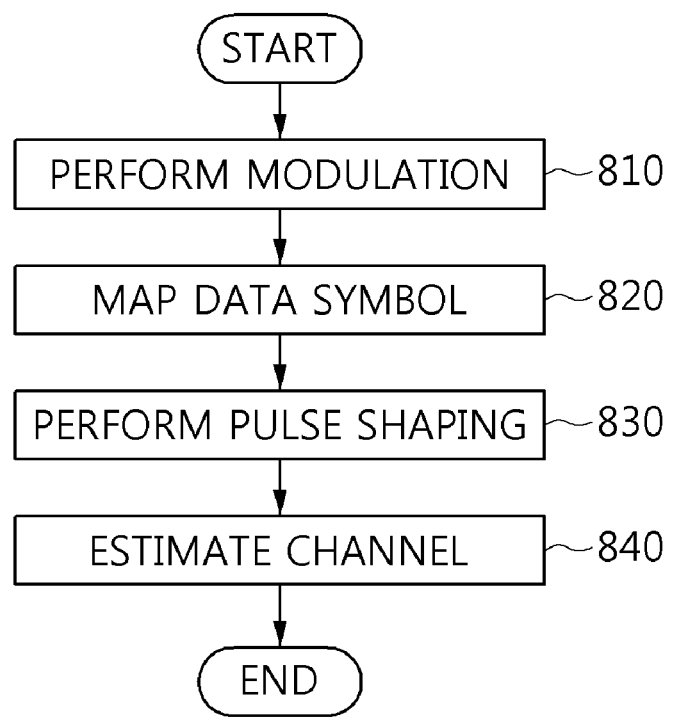
FIG. 8 is a flowchart of a method for estimating data FTN interference according to an embodiment.

FIG. 8 is a flowchart of a method for estimating data FTN interference according to an embodiment.

Step 665, having been described with reference to FIG. 6, may include steps 810, 820, 830 and 840.

At step 810, modulation is performed on an LLR sequence, the error of which is corrected, or a bit sequence, the error of which is corrected, whereby an estimated data symbol sequence may be generated.

The LLR sequence, the error of which is corrected, or the bit sequence, the error of which is corrected, may be input to a modulation unit 410.

The modulation unit 410 may modulate the LLR sequence, the error of which is corrected, or the bit sequence, the error of which is corrected, to symbols. The modulation unit 410 may generate an estimated data symbol sequence by modulating the LLR sequence, the error of which is corrected, or the bit sequence, the error of which is corrected.

At step 820, the estimated data symbol sequence is mapped to a position corresponding to the data symbol of a symbol sequence, and a null symbol is mapped to a position corresponding to the pilot symbol of the symbol sequence, whereby a symbol sequence to which data is mapped may be generated.

A data symbol mapper 420 may map the estimated data symbol sequence to the position corresponding to the data symbol of an entire symbol sequence and map a null symbol to the position corresponding to the pilot symbol of the entire symbol sequence.

The data symbol mapper 420 may generate a symbol sequence to which data is mapped by mapping the estimated data symbol sequence to the position corresponding to the data symbol of an entire symbol sequence and mapping a null symbol to the position corresponding to the pilot symbol of the entire symbol sequence.

At step 830, pulse-shaping is performed on the symbol sequence to which the data is mapped, whereby a symbol sequence including FTN interference may be generated.

A pulse-shaping unit 430 may perform pulse shaping on the symbol sequence to which the data is mapped.

The pulse-shaping unit 430 may receive the symbol sequence to which the data is mapped, and may output a symbol sequence including FTN interference. Here, the FTN interference may be data FTN interference.

The pulse-shaping unit 430 may estimate FTN interference generated in the process of transmitting and receiving a symbol using the transmission filter of a transmission device and the matched filter of a reception device. The pulse-shaping unit 430 may generate a symbol including FTN interference or a symbol sequence including FTN interference using the estimated FTN interference.

Each of the transmission filter and the matched filter may be an RRC filter. The pulse-shaping unit 430 estimates FTN interference between symbols depending on the RC filter coefficient value of the RRC filter, and may thereby output the symbol including FTN interference or the symbol sequence including FTN interference.

When the symbol sequence to which the data is mapped, which is the output of the data symbol mapper 420, is input to the pulse-shaping unit 430, the data symbol sequence of the input symbol sequence may be output as a symbol sequence that includes FTN interference generated between neighboring data symbols. Because the pilot symbol sequence of the input symbol sequence is the sequence of null symbols, the pilot symbol sequence may be output as a symbol sequence in which only interference generated due to data symbols is included.

In other words, the output of the pulse-shaping unit 430 may be a symbol sequence in which a data symbol sequence to which FTN interference is applied is present at the data symbol position and in which FTN interference of a data symbol on a pilot symbol is present at the pilot symbol position.

At step 840, the symbol sequence to which the data is mapped is eliminated from the symbol sequence including FTN interference, whereby estimated data FTN interference may be generated.

A symbol sequence elimination unit 440 may eliminate the symbol sequence to which the data is mapped, which is the output of the data symbol mapper 420, from the symbol sequence including FTN interference, which is the output of the pulse-shaping unit 430.

The symbol sequence elimination unit 440 eliminates the symbol sequence to which the data is mapped from the symbol sequence including FTN interference, and may thereby generate estimated data FTN interference.

The estimated data FTN interference may be input to a symbol separation unit 450.

The estimated data FTN interference is separated, whereby second estimated FTN interference and third estimated FTN interference may be generated.

The symbol separation unit 450 separates the pilot symbol position of the estimated data FTN interference from the data symbol position thereof, thereby separating the estimated data FTN interference into the second estimated FTN interference and the third estimated FTN interference.

The second estimated FTN interference may be interference at the data symbol position in the estimated data FTN interference. The third estimated FTN interference may be interference at the pilot symbol position of the estimated data FTN interference.

The symbol separation unit 450 may output each of the second estimated FTN interference, which represents interference between data symbols, and the third estimated FTN interference, which represents interference of a data symbol on a pilot symbol.

The second estimated FTN interference may be output to a second interference cancellation unit 134. The third estimated FTN interference may be output to a channel application unit 170.

Figure 9:
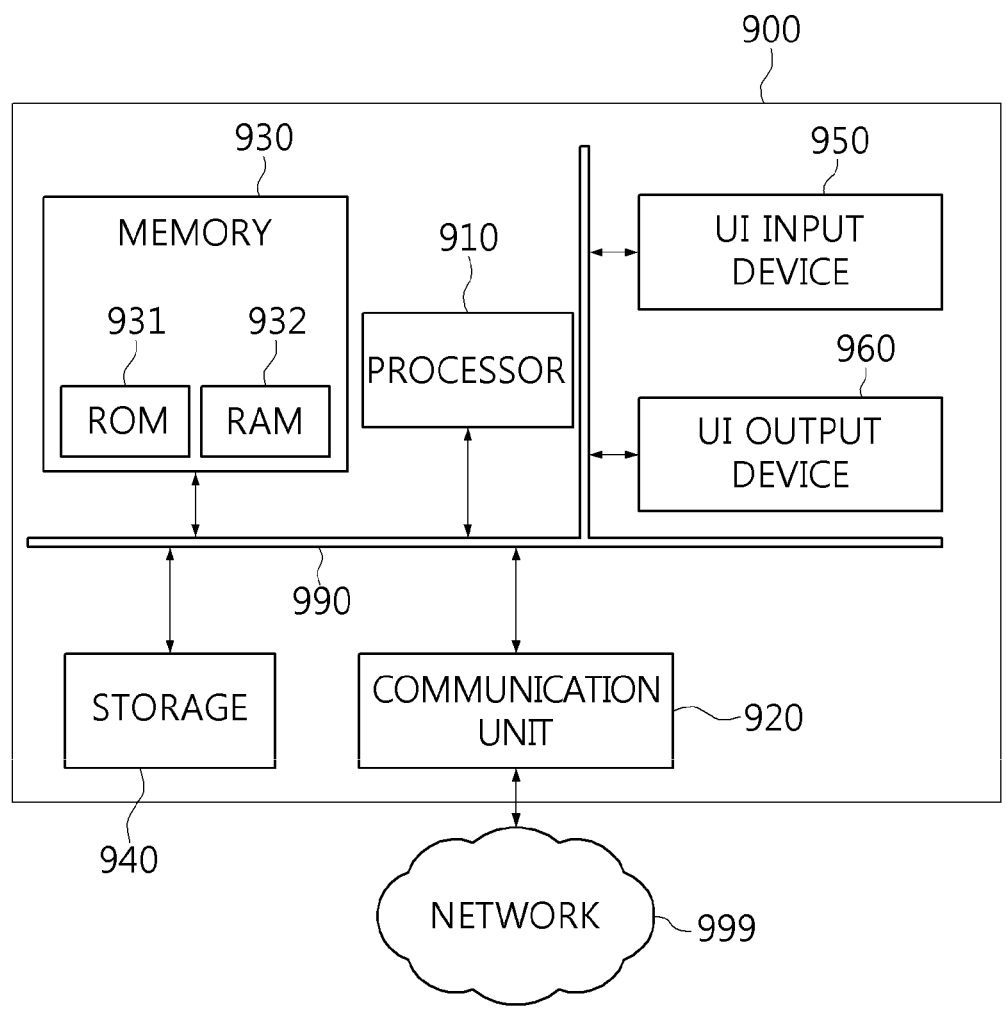
FIG. 9 is a block diagram of an electronic device for implementing a communication apparatus according to an embodiment.

FIG. 9 is a block diagram of an electronic device for implementing a communication apparatus according to an embodiment.

According to an embodiment, at least some of the symbol separation unit 110, the channel estimation and pilot FTN interference estimation unit 120, the channel compensation unit 130, the first interference cancellation unit 132, the second interference cancellation unit 134, the demodulation unit 140, the channel-decoding unit 150, the data FTN interference estimation unit 160, the channel application unit 170, and the third interference cancellation unit 172 of the communication apparatus 100 may be program modules and may communicate with an external device or a system. The program modules in the form of an operating system, an application module, or other program modules may be included in the communication apparatus 100.

The program modules may be physically stored on various known storage devices. Also, at least some of the program modules may be stored in a remote memory device that is capable of communicating with the communication apparatus 100.

The program modules may perform a function or operation according to an embodiment, or may include routines, subroutines, programs, objects, components, data structures, and the like for implementing abstract data types according to an embodiment, but the program modules are not limited to these examples.

The program modules may be configured with instructions or code executable by at least one processor of the communication apparatus 100.

The communication apparatus 100 may be implemented as the electronic device 900 illustrated in FIG. 9. The electronic device 900 may be a general-purpose computer system operating as the communication apparatus 100.

As illustrated in FIG. 9, the electronic device 900 may include at least one processor 910, memory 930, a User Interface (UI) input device 950, a UI output device 960, and storage 940, which communicate with each other via a bus 990. Also, the electronic device 900 may further include a communication unit 920 connected with a network 999.

The processor 910 may be a Central Processing Unit (CPU) or a semiconductor device for executing processing instructions stored in the memory 930 or the storage 940.

The processor 910 may include the symbol separation unit 110, the channel estimation and pilot FTN interference estimation unit 120, the channel compensation unit 130, the first interference cancellation unit 132, the second interference cancellation unit 134, the demodulation unit 140, the channel-decoding unit 150, the data FTN interference estimation unit 160, the channel application unit 170 and the third interference cancellation unit 172. Alternatively, the processor 910 may perform the functions or operations of the symbol separation unit 110, the channel estimation and pilot FTN interference estimation unit 120, the channel compensation unit 130, the first interference cancellation unit 132, the second interference cancellation unit 134, the demodulation unit 140, the channel-decoding unit 150, the data FTN interference estimation unit 160, the channel application unit 170 and the third interference cancellation unit 172.

The memory 930 and the storage 940 may be various types of volatile or nonvolatile storage media. For example, the memory may include at least one of ROM 931 and RAM 932.

The communication apparatus 100 may be implemented in a computer system that includes a computer-readable recording medium.

The recording medium may include at least one module required to enable the electronic device 900 to operate as the communication apparatus 100. The memory 930 may store at least one module therein, and the module may be configured so as to be executed by the at least one processor 910.

A function for data or information communication of the communication apparatus 100 may be performed through the communication unit 920. For example, the communication unit 920 may receive signals.

The device described herein may be implemented using hardware components, software components, or a combination thereof. For example, the device and components described in the embodiments may be implemented using one or more general-purpose or special-purpose computers, for example, a processor, a controller, an arithmetic logic unit (ALU), a digital signal processor, a microcomputer, a field-programmable array (FPA), a programmable logic unit (PLU), a microprocessor or any other device capable of responding to and executing instructions. The processing device may run an operating system (OS) and one or more software applications that run on the OS. The processing device may also access, store, manipulate, process, and create data in response to execution of the software. For convenience of understanding, the use of a single processing device is described, but those skilled in the art will understand that a processing device may comprise multiple processing elements and/or multiple types of processing elements. For example, a processing device may include multiple processors or a single processor and a single controller. Also, different processing configurations, such as parallel processors, are possible.

The software may include a computer program, code, instructions, or some combination thereof, and it is possible to configure processing devices or to independently or collectively instruct the processing devices to operate as desired. Software and data may be embodied permanently or temporarily in any type of a machine, a component, physical or virtual equipment, a computer storage medium, a device, or in a propagated signal wave in order to provide instructions or data to the processing devices or to be interpreted by the processing devices. The software may also be distributed in computer systems over a network such that the software is stored and executed in a distributed method. In particular, the software and data may be stored in one or more computer-readable recording media.

The above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

For a system based on FTN communication including a pilot, an apparatus and method for performing interference cancellation and channel estimation are provided.

An apparatus and method for improving the utilization of frequencies by applying an FTN transmission method are provided.

An apparatus and method in which the degradation of channel estimation performance, which arises from the distortion of a pilot, is minimized through iterative interference cancellation and channel estimation are provided.

An apparatus and method in which FTN interference of a data symbol on a pilot symbol is estimated and eliminated are provided.

An apparatus and method for improving channel estimation performance by repeatedly estimating and eliminating FTN interference are provided.

An apparatus and method for improving data symbol restoration performance through improved channel estimation performance are provided.

An apparatus and method for improving the reception performance of an entire system by repeatedly estimating and eliminating FTN interference are provided.

What is claimed is:

1. A method for processing a signal, comprising:
   separating a received signal into a sequence of pilot symbols and a sequence of data symbols;
   generating first estimated faster-than-Nyquist (FTN) interference and channel estimation information based on pilot FTN interference estimation and channel estimation using the sequence of the pilot symbols; and
   demodulating a sequence of data symbols from which FTN interference is eliminated, thereby generating a Log-Likelihood Ratio (LLR) sequence from which interference is eliminated or a bit sequence from which interference is eliminated;
   wherein the first estimated FTN interference is interference of a pilot symbol on a data symbol.

2. The method of claim 1, further comprising:
   generating a sequence of channel-compensated data symbols by compensating for a channel impact included in the received signal using the channel estimation information.

3. The method of claim 2, further comprising:
   eliminating the first estimated FTN interference from the sequence of the channel-compensated data symbols and thereby generating a sequence of data symbols from which the interference of the pilot symbol on the data symbol is eliminated.

4. The method of claim 1, further comprising:
   performing channel decoding on the LLR sequence from which the interference is eliminated or the bit sequence from which the interference is eliminated, and thereby generating an LLR sequence, an error of which is corrected, or a bit sequence, an error of which is corrected.

5. The method of claim 4, further comprising:
   deinterleaving the LLR sequence from which the interference is eliminated or the bit sequence from which the interference is eliminated; and
   interleaving the LLR sequence, the error of which is corrected, or the bit sequence, the error of which is corrected.

6. The method of claim 1, further comprising:
   generating second estimated FTN interference and third estimated FTN interference using the LLR sequence, an error of which is corrected, or the bit sequence, an error of which is corrected,
   wherein the second estimated FTN interference is interference between data symbols, and the third estimated FTN interference is interference of a data symbol on a pilot symbol.

7. The method of claim 6, further comprising:
   applying a currently estimated channel, represented by the channel estimation information, to the third estimated FTN interference, and thereby generating FTN interference to which a channel is applied.

8. The method of claim 7, further comprising:
eliminating the FTN interference to which the channel is applied from the sequence of the pilot symbols, and thereby generating a sequence of pilot symbols from which interference is eliminated.

9. The method of claim 6, wherein generating the second estimated FTN interference and the third estimated FTN interference comprises:
generating an estimated data symbol sequence by modulating the LLR sequence, the error of which is corrected, or the bit sequence, the error of which is corrected;
generating a symbol sequence to which data is mapped by mapping the estimated data symbol sequence to a position corresponding to a data symbol of a symbol sequence and mapping a null symbol to a position corresponding to a pilot symbol of the symbol sequence;
generating a symbol sequence including FTN interference by performing pulse shaping on the symbol sequence to which the data is mapped;
generating estimated data FTN interference by eliminating the symbol sequence to which the data is mapped from the symbol sequence including the FTN interference; and
generating the second estimated FTN interference and the third estimated FTN interference by separating the estimated data FTN interference.

10. The method of claim 9, wherein:
the second estimated FTN interference is interference at a position of a data symbol of the estimated data FTN interference; and
the third estimated FTN interference is interference at a position of a pilot symbol of the estimated data FTN interference.

11. The method of claim 1, wherein:
generating the first estimated FTN interference and the channel estimation information is repeatedly performed; and
at second or subsequent iterations of generating the first estimated FTN interference and the channel estimation information, as the sequence of the pilot symbols, a sequence of pilot symbols from which interference is eliminated is input.

12. The method of claim 1, wherein generating the first estimated FTN interference and the channel estimation information comprises:
generating a symbol sequence to which a pilot is mapped by mapping a generated pilot to a position corresponding to a pilot symbol of a symbol sequence and mapping a null symbol to a position corresponding to a data symbol of the symbol sequence;
generating a symbol sequence including FTN interference by performing pulse shaping on the symbol sequence to which the pilot is mapped; and
generating pilot estimation information and the first estimated FTN interference based on the symbol sequence including the FTN interference.

13. The method of claim 12, wherein the FTN interference corresponds to estimation of interference generated in a process of transmitting and receiving a symbol using a transmission filter of a transmission device and a matched filter of a reception device.

14. The method of claim 13, wherein each of the transmission filter and the matched filter is a Root Raised Cosine (RRC) filter.

15. The method of claim 14, wherein the symbol sequence including the FTN interference is generated by estimating FTN interference between symbols depending on a Raised Cosine (RC) filter coefficient value of the RRC filter.

16. The method of claim 12, wherein:
a pilot symbol sequence of the symbol sequence including the FTN interference is a symbol sequence in which FTN interference generated between neighboring pilot symbols is included; and
a data symbol sequence of the symbol sequence including the FTN interference is a symbol sequence in which only interference generated due to pilot symbols is included.

17. The method of claim 12, wherein:
the symbol sequence including the FTN interference is separated into a symbol sequence corresponding to a pilot symbol position and a symbol sequence corresponding to a data symbol position; and
the symbol sequence corresponding to the data symbol position represents the first estimated FTN interference.

18. A method for processing a signal, comprising:
separating a received signal into a sequence of pilot symbols and a sequence of data symbols; and
generating first estimated faster-than-Nyquist (FTN) interference and channel estimation information based on pilot FTN interference estimation and channel estimation using the sequence of the pilot symbols by:
generating a symbol sequence to which a pilot is mapped by mapping a generated pilot to a position corresponding to a pilot symbol of a symbol sequence and mapping a null symbol to a position corresponding to a data symbol of the symbol sequence;
generating a symbol sequence including FTN interference by performing pulse shaping on the symbol sequence to which the pilot is mapped; and
generating pilot estimation information and the first estimated FTN interference based on the symbol sequence including the FTN interference
wherein the first estimated FTN interference is interference of a pilot symbol on a data symbol.

* * * * *